(12) United States Patent
Celeste

(10) Patent No.: US 6,788,640 B2
(45) Date of Patent: Sep. 7, 2004

(54) UNIVERSAL MASS STORAGE INFORMATION CARD AND DRIVE ASSEMBLY

(76) Inventor: Salvatore Celeste, 24 Elmwood Cir., Peabody, MA (US) 01960

( * ) Notice: Subject to any disclaimer, the term of this patent is extended or adjusted under 35 U.S.C. 154(b) by 553 days.

(21) Appl. No.: 09/934,363

(22) Filed: Aug. 21, 2001

(65) Prior Publication Data

US 2002/0024906 A1 Feb. 28, 2002

Related U.S. Application Data

(60) Provisional application No. 60/227,171, filed on Aug. 23, 2000.

(51) Int. Cl.[7] .............................................. G11B 3/70
(52) U.S. Cl. ........................................ 369/272; 369/75.1
(58) Field of Search ............................ 369/52.1, 272, 369/273, 289, 290, 14, 15, 75.1; 235/454, 449, 493; 360/1, 2, 131, 135

(56) References Cited

U.S. PATENT DOCUMENTS

| | | | | |
|---|---|---|---|---|
| 5,107,099 A | * | 4/1992 | Smith | 235/449 |
| 5,647,505 A | * | 7/1997 | Scott | 221/2 |
| 5,844,757 A | * | 12/1998 | Rose | 360/131 |
| 6,597,653 B1 | * | 7/2003 | Burnett | 369/273 |

* cited by examiner

Primary Examiner—Paul W. Huber
(74) Attorney, Agent, or Firm—E. Lieberstein

(57) ABSTRACT

This invention relates to a universal mass storage information card comprising a first data storage portion having a circular geometry in the form of a disk and a second data storage portion physically detachable from the first data storage portion with the second data storage portion defining a geometrical area disposed within the periphery of the first portion and being concentric therewith, with the first data storage portion including software to verify user identification when the two data storage portions are combined and software to read and download information contained in the second data storage portion when the two are inserted as a combined unit into a data processing machine. In the preferred embodiment the information tracks of the first data storage portion form a spiral geometry extending into the second data storage portion and software is included in the mass storage information card in the form of an algorithm which identifies the sections of information track in the second data storage portion to which information can be written when separated from the first data storage portion. The invention also includes a drive assembly to enable data to be read from and transferred to the detachable second data storage portion of the mass storage information card when separated from the first data storage portion.

9 Claims, 7 Drawing Sheets

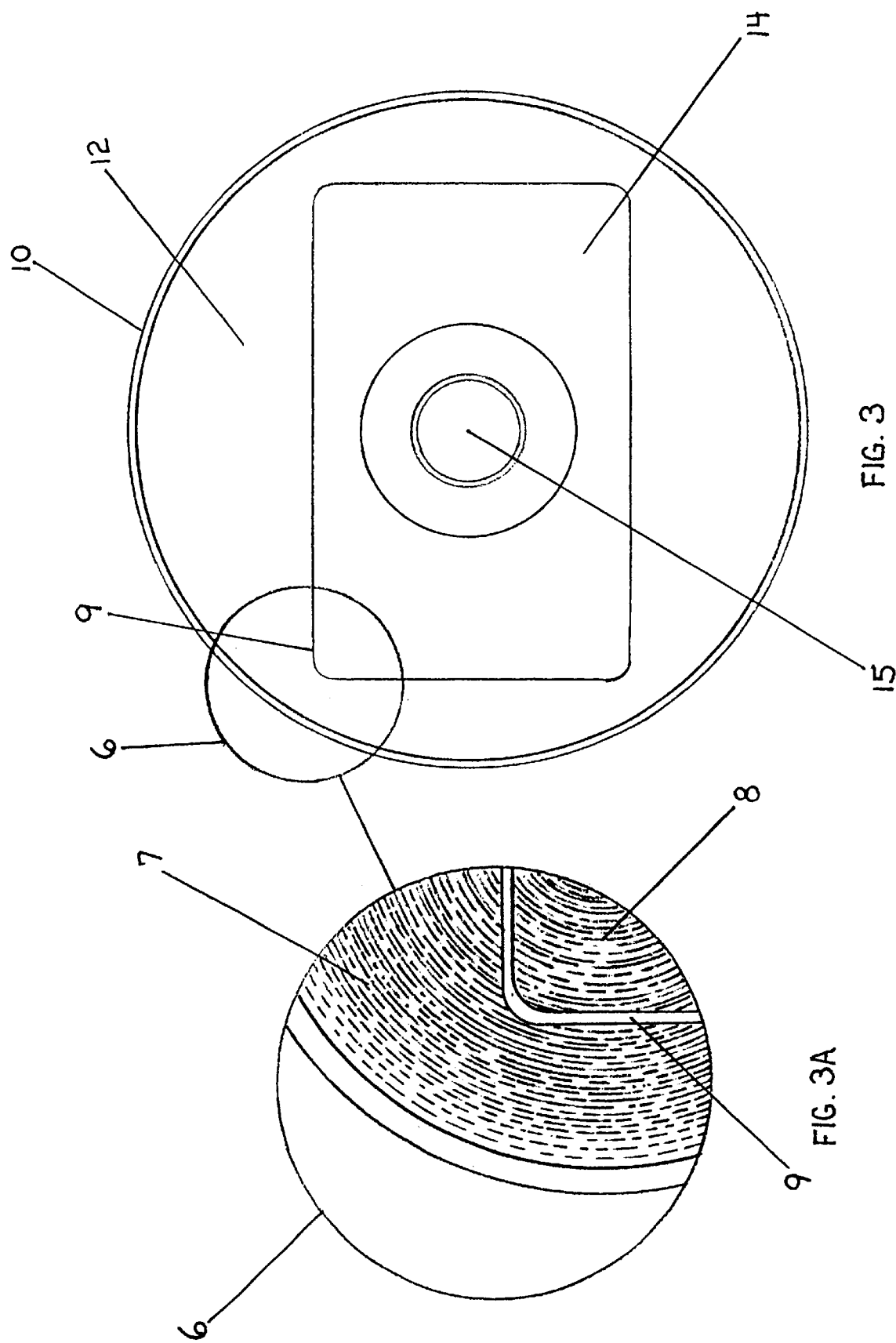

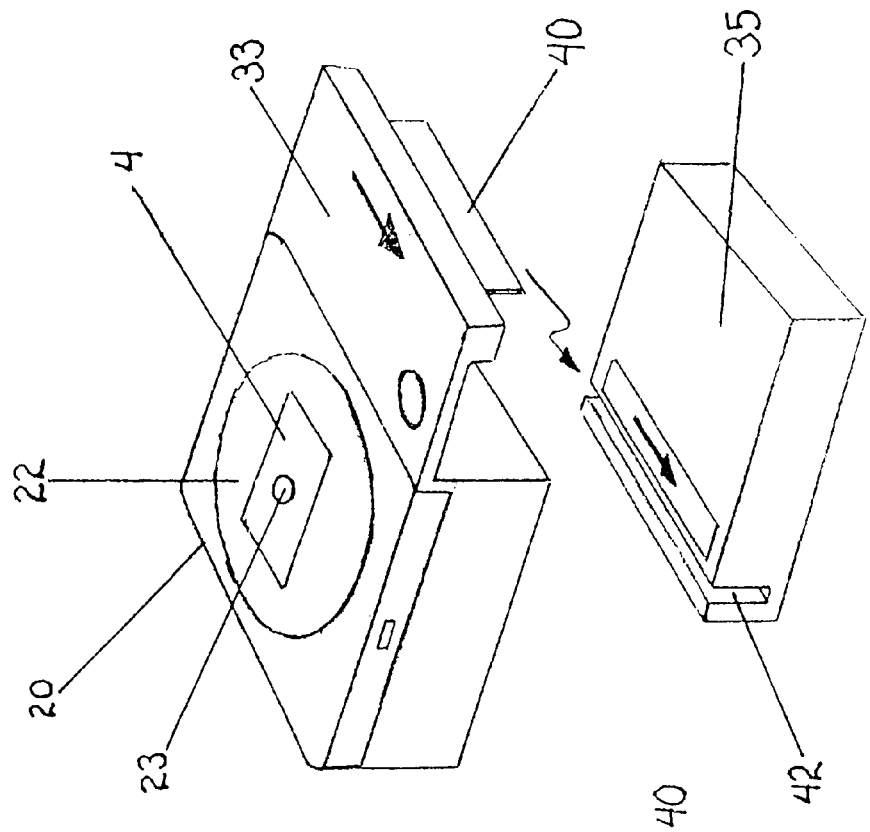

Device Block Diagram

ONE CARD FLOW CHART

UNIVERSAL MASS STORAGE INFORMATION CARD AND DRIVE ASSEMBLY

This application claims the benefit of Provisional Application No. 60/227,171 filed Aug. 23, 2000.

FIELD OF INVENTION

This invention relates to a universal mass storage information card having two separate data storage portions with one data storage portion being physically detachable from the other and to a drive assembly to enable data to be read from and transferred to one of the detachable data storage portions of the mass storage information card when separated from the other data storage portion.

BACKGROUND OF THE INVENTION

Present day commercially available credit cards are essentially all standardized in rectangular configuration and physical dimension and utilize a magnetic strip for transferring code information to an authorization center. The magnetic strip extends along one edge of the credit card on one side thereof and is used to authenticate a credit card transaction. The magnetic strip contains code information which is transferred to a credit card authorization center when swiped in a magnetic card reader. The code information identifies a given account and permits the credit card authorization center to validate the transaction after verifying the available credit of the card owner. This is done based on the assumption that the owner of the card as identified by the code information is using the card. The code information on the magnetic strip is transferred through the card reader via a telephone modem to the credit card authorization center representing, e.g., a bank or other financial institution for authorization or disapproval of the transaction. Although the use of the standard type credit card has become commonplace the magnetic strip is extremely limited in data storage capacity and, as a practical matter, is limited to the storage of an account number. This limitation of the standard type credit card prevents the issuer from storing information on the card which may prevent fraudulent credit card transactions based upon false identity and/or unauthorized use. Moreover, the standard type credit card offers almost no control to the owner of the card to prevent unauthorized use of the card or the card number. In fact, the only recourse available to the owner of the card is to contact the card issuer to deactivate the credit card and invariably only after a fraudulent transaction has occurred. Moreover, at present, every credit card institution i.e., bank, finance and/or credit company must issue a separate credit card for each separate account even to the same credit card holder. This requires a card holder to carry multiple cards in his or her possession to facilitate different retail or credit transactions under the different account numbers which is both cumbersome and undesirable.

"Smart cards" have been proposed to increase the storage capacity of the standard credit card using one or more integrated circuits incorporated into the card. However the architecture of a conventional data processing machine or personal computer does not permit a smart card having one or more built-in integrated circuits to interface therewith without substantial modification. However, reading and writing to a smart card which utilizes built-in integrated circuitry is not structurally compatible for use with conventional computer storage devices, i.e., floppy disks or hard drives and is certainly incompatible for use with conventional magnetic credit card swipe units both structurally and electronically. Accordingly, to coordinate and interface the use of a smart card having a built-in integrated chip with a data processing machine such as a personal computer would require complex and expensive accessory devices and possibly also require the adoption of a new standardized configuration for the card other than a rectangular configuration. For this reason smart cards which utilize one or more built-in integrated circuits have not, as yet, been commercialized to any significant extent.

SUMMARY OF THE INVENTION

The mass storage information card of the present invention is a "smart card" which does not require any built-in integrated circuitry and can interact with a conventional disk or cassette drive already existing in personal computers or in other conventional data processing machines without structural or architectural modification. In addition, the mass storage information card of the present invention has a data storage capability of over several hundred megabytes of digital information and can be programmed and reprogrammed at will and with the content and type of data storage information to be transferred to a third party under the control of the card holder. Moreover, the mass storage information card of the present invention may function as a universal "one" card in the sense that it can represent a multiplicity of different institutions both for credit transactions and for record purposes, i.e., the same card may be used on behalf of all credit card institutions simultaneously as well as representing in a single card a reservoir of record information for various other purposes such as medical and dental records, license records and multiple other information records.

It is because the storage capacity of the mass storage information card of the present invention is almost limitless that the card can be used to carry personal information other than credit information to enable the same card to be used not only as a credit card but also as a prescription card for drugs, an insurance card, library card, drivers license medical card etc., i.e., as a universal information card. For example, all medical records can be stored on the card including x-rays, photos and charts. Instead of a medical doctor writing a prescription on a slip of paper which may be misread the prescription can be written to the card. A druggist can then read the prescription from the card using his data processing machine and fill the prescription which will then be recorded on the card. Because the card contains all of the medical information for the card owner a pharmacist or doctor can spot conflicting medications that have been prescribed by another pharmacist or doctor respectively. More importantly no unauthorized modifications to the prescription can be made. In fact no modifications or alterations of any of the record information can be made except by the card owner and then only when both data storage portions of the card are used together as will be further explained hereafter thereby making it impossible for anyone to engage in fraudulent or unlawful activity.

The mass storage information card of the present invention has a unique physical structure comprising two independent data storage portions with one data storage portion being physically detachable from the other. When the two data storage portions are physically separated, a given one of the two data storage portions is designed for use independent of the other for handling credit and other transactions in a manner equivalent to the use of a conventional credit card and can also be used for obtaining other types of record information. However, neither of the two data storage portions can be modified or its encrypted information accessed without the combined use of both. The two independent data storage portions include a first portion of circular configuration preferably equal in diameter to that of a standard compact disk as conventionally used in a personal computer and a second portion detachable from the first portion with the second portion defining a concentric area of reduced dimension within the periphery of the first portion. The second portion is preferably of a rectangular configuration. When the two independent data storage portions are united a single mass storage information card is formed which defines a basic compact disc system having mass storage capability. With both portions intact information may be read from the card and information may be written to the card in a conventional fashion using the conventional disk or cassette drive as already exists in personal computers or in other conventional data processing machines without structural or architectural modification.

Both portions of the card are separably capable of storing large amounts of information. The detachable portion of the card is preferably physically dimensioned to match the dimensions of a standard rectangular magnetic credit card and preferably contains software inclusive of a file allocation table i.e., a table of contents for the card. The detachable portion of the card, hereafter referred to as the rectangular portion, is intended to be used separate and independent of the outer circular portion for handling credit card transactions as well as to store all transactional information when the card is used as a credit medium and as a storage medium for the storage of various types of record information of the card user.

The circular portion of the card, hereafter referred to as the "security ring", contains software programs to perform installation and set up functions, encryption algorithms for encrypting data stored in the rectangular portion and software to enable the user to program user restrictions in the detachable portion of the card. In addition the security ring verifies user identification and verifies the presence of the specific rectangular portion to which it is married by software verification.

The invention also includes a separate drive assembly for use in connection with the rectangular portion of the card when it is used independent of the security ring. The separate drive assembly of the present invention enables a user to read data from the rectangular storage portion of the mass storage information card independent of the security ring. The rectangular portion of the card can be read from either a conventional data processing machine such as a personal computer, a commercially available cash register or from a conventional magnetic card reader. When the rectangular portion of the card is to be used with a data processing machine such as a personal computer and/or a commercially available cash register the drive assembly of the present invention permits information to be written to the rectangular portion of the card as well as to read data stored therein.

BRIEF DESCRIPTION OF THE DRAWINGS

The unique features and characteristics of this invention are set forth in particular in the appended claims. Additional objectives and advantages of the present invention will be best understood from the following description of the preferred embodiment when read in connection with the accompanying drawings of which:

FIG. 3 is another plan view of the mass storage information card of FIG. 1 in which an area defined by a circle is shown magnified in FIG. 3a;

FIG. 3a is the magnified circular area shown in FIG. 3 encircling one of the corners of the detachable portion of the card and the immediate area of the security ring contiguous to the encircled corner;

FIG. 4a is a side elevation of the drive assembly of the present invention for reading and writing information to and from the detachable portion of the card;

FIG. 4b is a top view of the drive assembly of FIG. 4a;

FIG. 5a is a diagrammatic view of the drive assembly shown in FIGS. 4a and 4b with the adapter of the drive assembly shown oriented before insertion into a standard magnetic strip card reader;

FIG. 5b is a diagrammatic view of a standard magnetic strip card reader with the arrow identifying proper alignment for receipt of the adapter of the drive assembly of FIGS. 4a and 4b;

DESCRIPTION OF A PREFERRED EMBODIMENT OF THE INVENTION

Referring now more particularly to FIGS. 1–6 in which the mass storage information card 10 of the present invention is shown comprising two independent data storage portions 12 and 14 respectively. The data storage portion 14 is physically detachable from the data storage portion 12 forming, when separated, two independent data storage mediums. The data storage portion 12 is in the form of a disk of circular geometry surrounding the detachable portion 14 which is preferably of rectangular geometry. Although the detachable portion 14 of the card 10 is preferably of rectangular geometry this is not essential to the present invention. The data storage portion 12 constitutes the data security ring for the detachable portion 14 and is hereafter referred to as the security ring. The two portions are preferably concentric, i.e., they should have a common point of registration coinciding with the center of each portion. The mass storage information card 10 may be composed from any material composition although preferably of non-conductive plastic.

Figure 1:
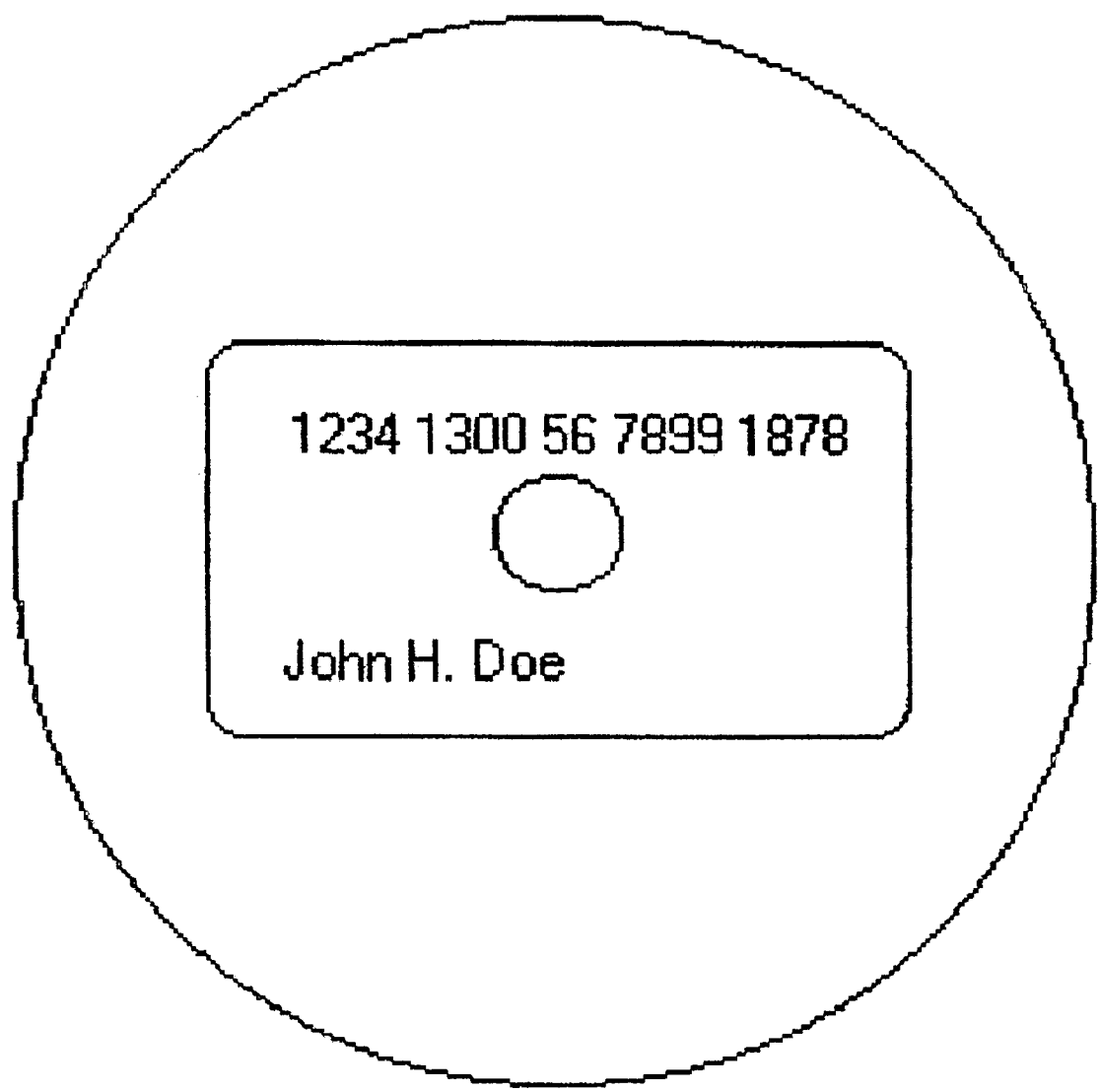
FIG. 1 is a plan view of the mass storage information card of the present invention.
Figure 2:
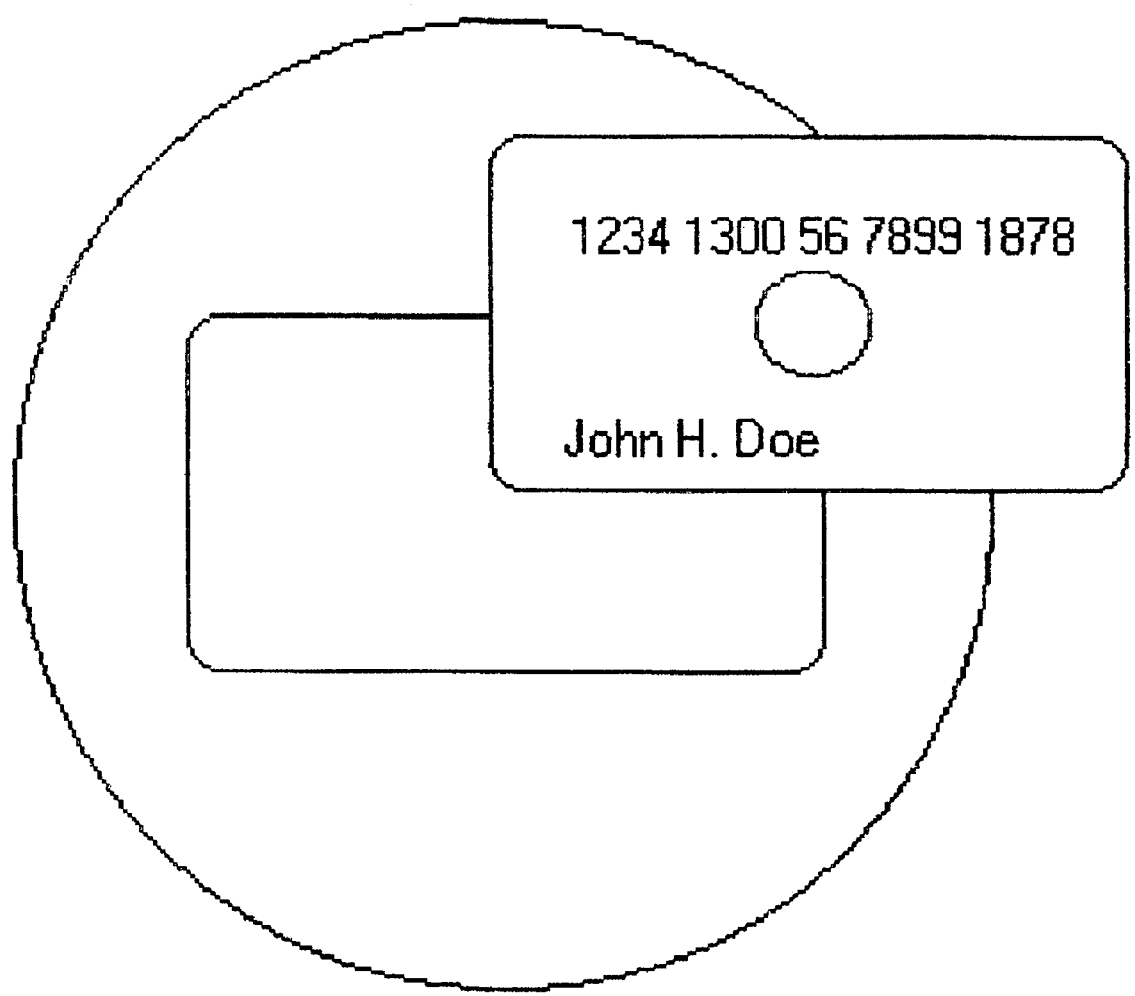
FIG. 2 is a view of the mass storage information card shown in FIG. 1 with the detachable portion of the card separated from the outer security ring.
Figure 6:
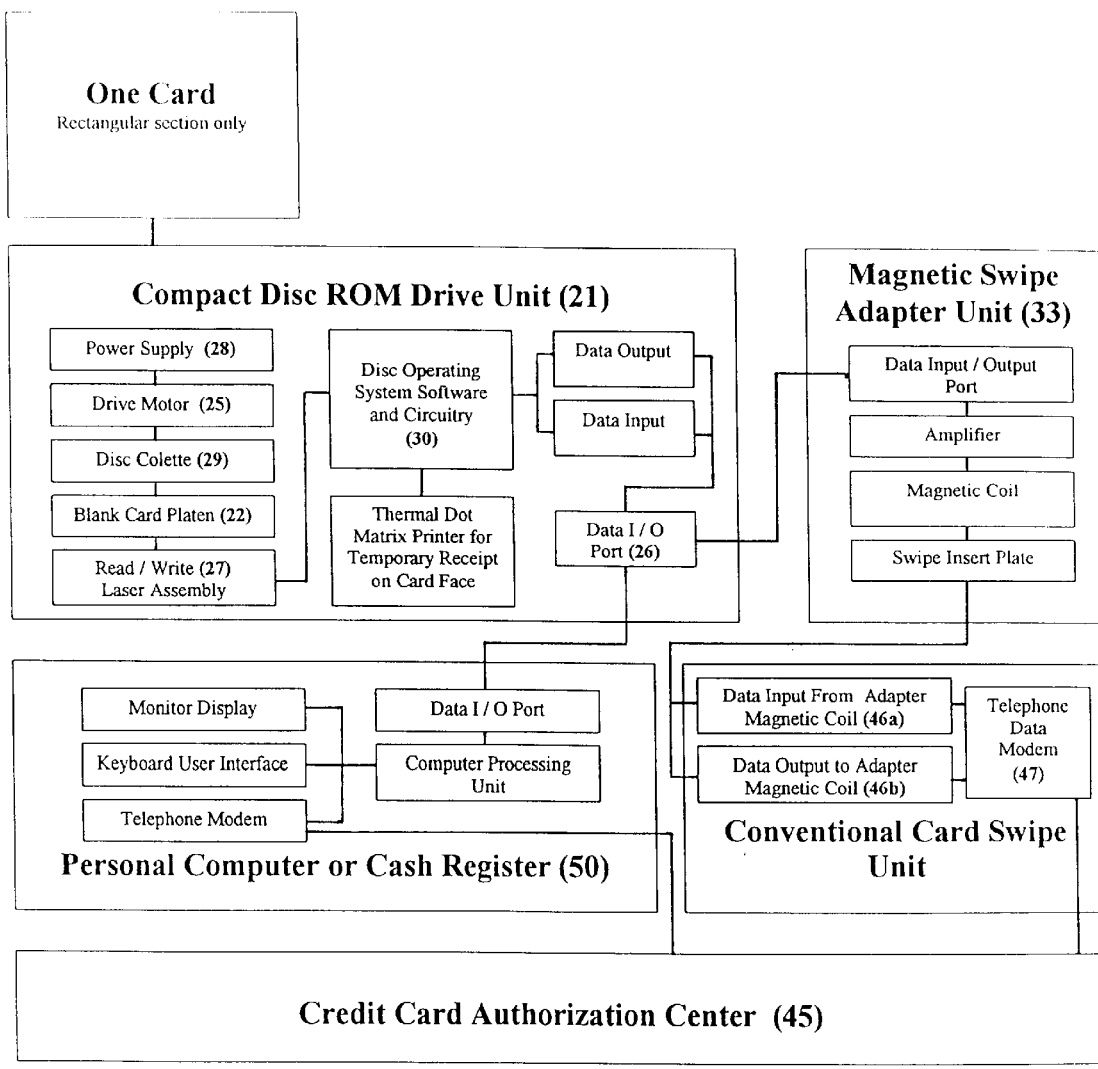
FIG. 6 is a schematic block diagram of the preferred drive assembly of the present invention and a skeleton block diagram of a personal computer or cash register and of a magnetic card reader.
Figure 7:
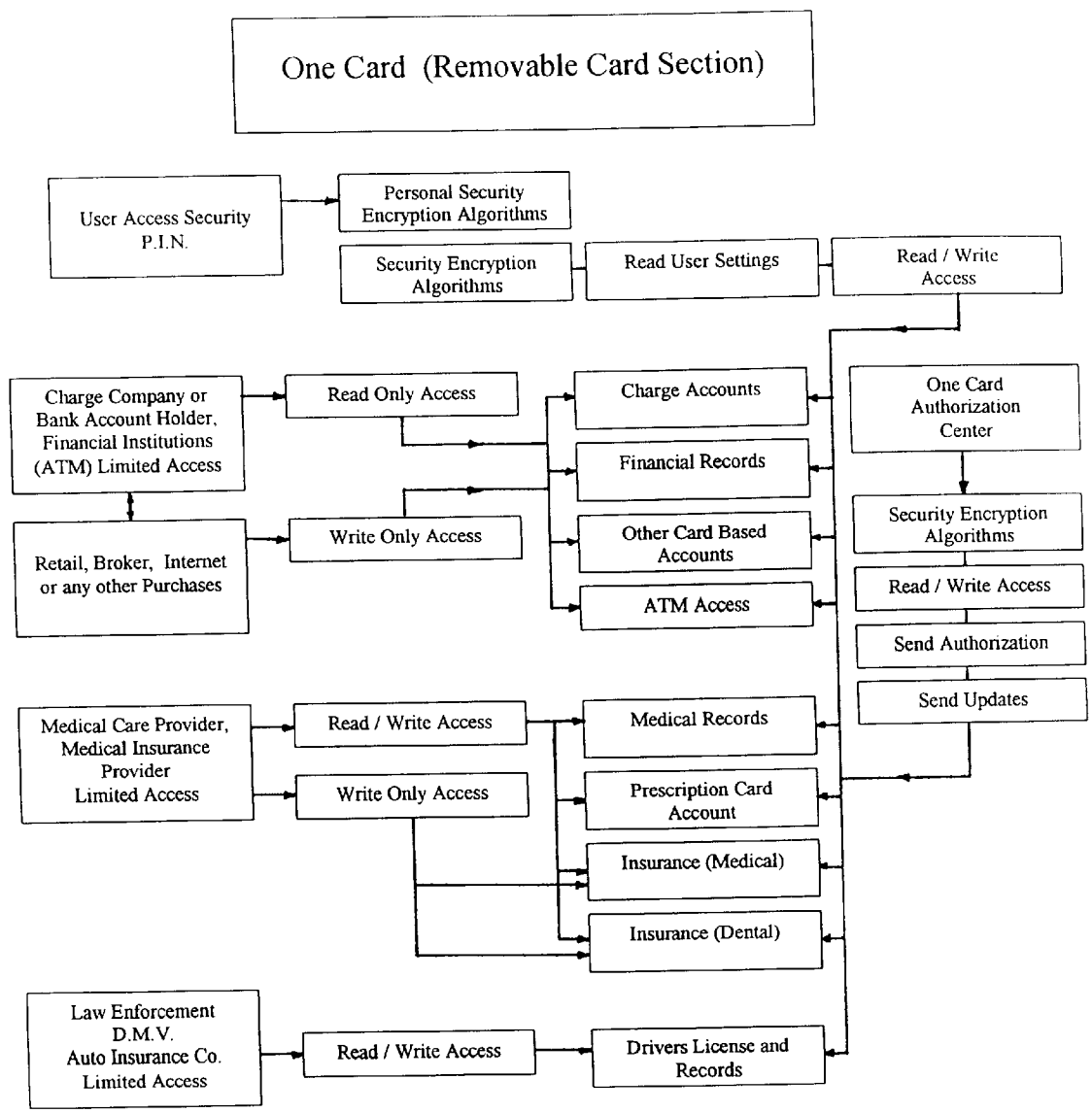
FIG. 7 is a chart identifying the type of data to be stored in the detachable portion of the mass storage information card of the present invention.
Figure 8:
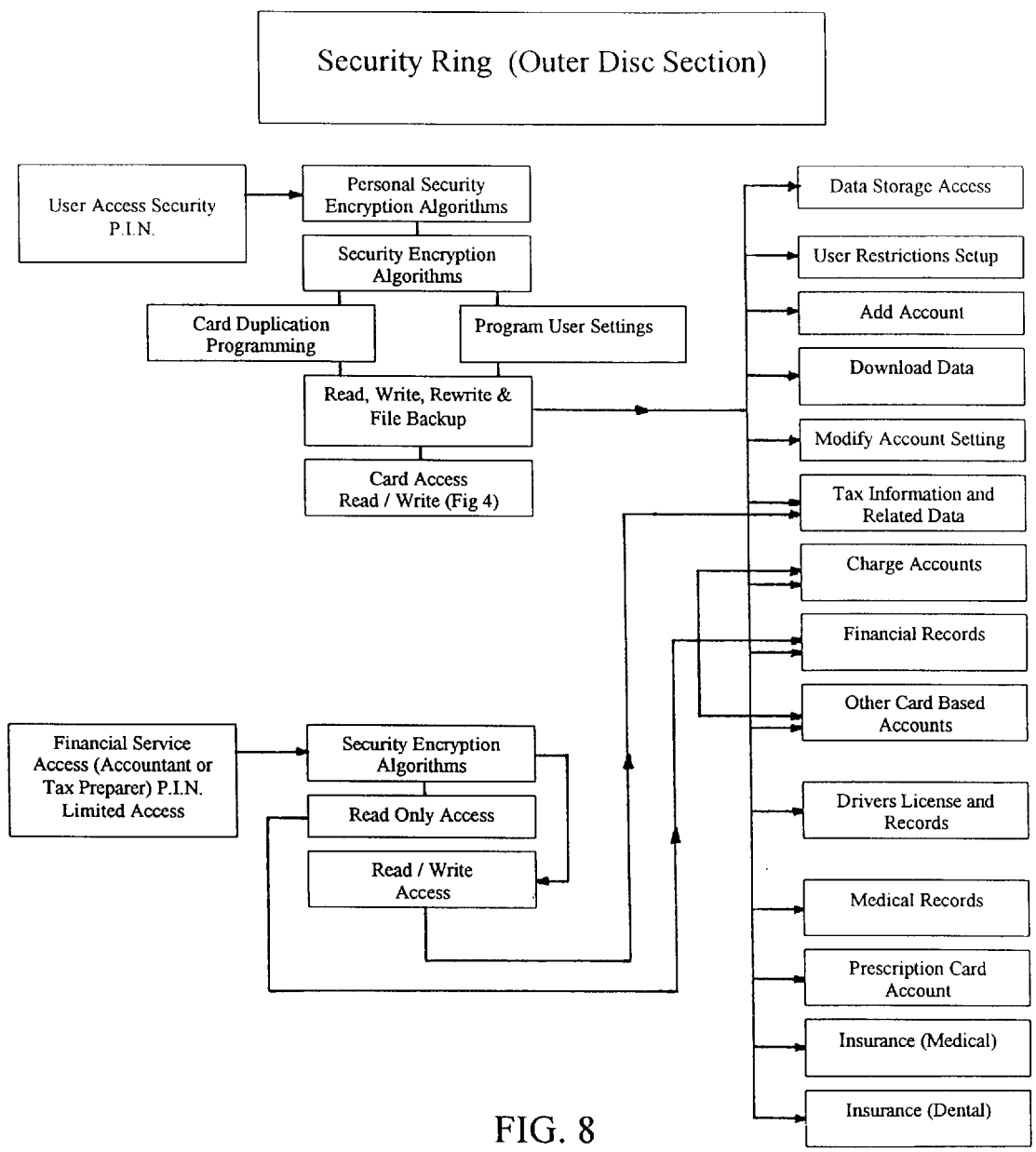
FIG. 8 is a chart identifying the type of data to be stored in the security ring portion of the mass storage information card of the present invention.

The center of the rectangular portion 14 preferably includes a circular aperture 15 which permits the rectangular portion 14 to be mounted over a collet member in the preferred driver assembly 20 which is to be discussed hereafter for reading and writing to the rectangular portion 14 when used separately from the security ring 12. The rectangular portion 14 should conform in physical dimensions to the physical dimensions of a standard rectangular magnetic credit card. The security ring 12 must however conform in its physical dimensions to the physical dimensions of a standard compact disk "CD" so that when the rectangular portion 14 is in place in the security ring 12 as shown in FIG. 1 the card 10 may be inserted into a conventional disk drive of a personal computer for installation and set up as is conventionally done when installing a compact disk containing stored programs.

When both portions 12 and 14 are united a mass storage information card 10 is formed for use with any conventional disk driver present in any conventional data processing machine inclusive of a personal computer or commercially available cash register. The card 10 containing both portions 12 and 14 may be used to modify stored information, change security codes, add or change user restrictions, create a new rectangular portion 14 and download information. This would be done following instructions provided by the stored program in the card 10 in a conventional fashion without structural or architectural modification to the conventional data processing machine. A conventional data processing machine such as a personal computer contains a disk or cassette driver such as, for example, a conventional 3½-inch disk drive intended to read and write data from and to a corresponding conventional compact 3½ inch floppy disk when it is inserted into the 3½ inch disk drive. Accordingly, the diameter of the security ring 12 must be selected to correspond to the appropriate disk drive size of the computer in which it is installed.

Since the rectangular portion 14 is detachable from the security ring 12 a physical delineation 9 exists between the two portions 12 and 14, as shown in FIGS. 3 and 3a, which defines the physical outline or boundary of the data storage portion 14 separating the data storage portion 14 from the data storage portion 12. FIG. 1 shows the two portions 12 and 14 united as one card 10 whereas in FIG. 2 the rectangular portion 14 is shown separated from the outer security ring 12. FIG. 3 is similar to FIG. 1 showing the two portions 12 and 14 combined with an area 6 thereof shown enlarged in FIG. 3a to illustrate concentric or spirally formed tracks 7 and 8 which when formed in the outer security ring 12 and rectangular portion 14 of the card 10 will extend or cross over the physical delineation 9 when continuing to the other respective portion of the card 10. The physical delineation 9 constitutes the perimeter of the removable data storage portion 14 and defines, by definition, the outline and position of cross over between the corresponding tracks of information. The tracks of information in each of the data storage portions 12 and 14 will cross in succession from portion 12 to portion 14, and vice versa, as the track passes over the point of delineation 9 as is evident from the enlarged view of FIG. 3a.

When the entire card 10 is placed in the disk drive of a conventional personal computer the computer operating software may consider the card 10 as containing corrupted information at each cross over point of delineation 9 between the information tracks 7 and 8 in the card 10 and may ignore such corrupted data in each track or may interpret the delineation 9 in the card 10 as representing a defective card. To overcome this problem the card 10 preferably includes a software file allocation table, i.e., table of contents which will provide a map to identify the information tracks in the card 10 as well as the point of delineation 9 at each intersection of track 7 and 8 between the data storage portion 12 and the data storage portion 14 which is represented in the form of an algorithm specific to the dimensions of the portions 12 and 14 in card 10 so that no data will be written to or read from the card 10 at the point of delineation 9, i.e., the point of delineation 9 will be skipped over when reading and writing data to the card 10. The software file allocation table can be stored in the security ring 12 or in the rectangular portion 14. This permits the mass storage information card 10, when intact, to be handled in a manner equivalent to a conventional CD for reading and writing information from and to the card 10 using a conventional personal computer. A software file allocation table, i.e., table of contents for card 10 can be readily prepared by any programmer skilled in the art. This can be done once the geometry and proportional size of each data storage portion 12 and 14 is fixed relative to one another so that the delineation 9 can be mapped and defined.

Information is intended to be separately stored in the detachable data storage portion 14 of the card 10 representing, for example, medical information, auto insurance information, law enforcement information, driver license etc., as well as account information for using the detachable data storage portion 14 as a credit card. All transactional data will be stored in the data storage portion 14 of the card 10 and, as such, the storage portion 14 of the card 10 functions both as a credit card and as an information card. Even when used solely as a credit card the detachable data storage portion 14 has the advantage in that much more information can now be available to a credit and finance institution and to the card user in that the detachable data storage portion 14 can also store the transactional information relating to each transaction including identifying the item purchased, price, warranty etc.

The security ring 12 is used to program various parameters restricting the use of the storage portion 14 as well as the owners security PIN numbers and the encryption programs for encrypting stored information with different security encryptions and provides the instructions for the owner to modify the PIN numbers and to deactivate a card 10 and create and reactivate a new detachable storage portion 14 from a blank rectangular card if the original rectangular portion 14 is lost or stolen using the original security ring 12 which contains all of the security information and data to create a new rectangular portion 14 to replace the old one.

Whenever the rectangular portion 14 of the card 10 is detached from and used independent of the security ring 12 a drive assembly 20 for reading data from the rectangular portion 14 and for writing data to the data storage portion 14 of the card 10 is necessary. The drive assembly 20 is shown diagrammatically and in a block diagram format in FIGS. 4–6 respectively. The drive assembly 20 includes a compact disk drive unit 21 and an adapter 33. The adapter 33 is used only when the data storage portion 14 of the card 10 is to be made compatible for use with a conventional magnetic card reader as presently used for reading the magnetic strip of a conventional credit card. The drive assembly 20 may be used as an independent drive unit or may be incorporated into a data processing machine such as a personal computer or cash register. The compact disk drive unit 21 comprises a conventional turntable and collet assembly 29, a conventional drive motor 25, a data I/O port 26, a conventional read/write laser assembly 27, a conventional power supply 28, an optional thermal dot matrix printer 32 which will be discussed later in the specification and disk system operating software 30.

The turntable and collet assembly 29 includes a collet 23, as identified in FIG. 4b, and a blank card platen 22. The blank card platen 22 has a circular disk-like geometry which matches the geometry and diameter of a standard compact disk except for a cutout section 24 which is sized to match the rectangular portion 14 of the card 10. The rectangular portion 14 is designed to fit into the cut-out section 24 with the aperture 15 in the center of the card portion 14 mounted over the collet 23 of the turntable and collet assembly 29.

The disk system operating software 30 includes a software file allocation table for skipping the delineations between the rectangular portion 14 and the circular disk-like geometry of the blank card platen 22 which is essentially identical to the delineations 9 between the rectangular portion 14 and the security ring 12 of the card 10. The disk system operating software 30 also includes software programs for writing and reading to the rectangular portion 14 of the card 10 when used with the drive assembly 20. Thus only the information from the rectangular portion 14 of the card 10 will be transferred to the output port of the compact disk drive unit 21 for reading data from the rectangular portion 14 of the card 10 upon rotation of the turntable and collet assembly 29 and likewise data will only be written to the rectangular portion 14 of the card 10 through the input port of the of the compact disk drive unit 21 when used in conjunction with a computer or cash register 50.

The adapter 33 is a unit which extends from the housing of the compact disk drive unit 21 to permit use of the rectangular portion 14 of the card 10 in conjunction with a standard magnetic card reader 35 as shown in FIGS. 4 and 5 respectively. The adapter 33 as shown in the block diagram of FIG. 6 includes its own I/O port 37, an amplifier 38, a magnetic coil 39 and a swipe insert plate 40. The swipe insert plate 40 is adapted to fit into the insert section 42 of the standard magnetic card reader 35 as shown in FIG. 5b. Information stored in the rectangular data storage portion 14 of the card 10 can be transferred to a credit card authorization center 45 such as a bank or finance institution via the standard magnetic card reader 35 by placing the rectangular portion 14 into the cut-out section 24 of the turntable and disk collet assembly 29. The insert plate 40 of the adapter 33 must also be physically placed into the insert section 42 of the standard magnetic card reader 35 to receive and/or transmit data from the rectangular portion 14. To facilitate this a drive assembly 20 will be made available to retail and other establishments having standard magnetic card readers 35 to facilitate use of the rectangular portion 14 as being the equivalent of a conventional credit card. The magnetic coil 39 in the adapter 33 electromagnetically transfers data from or into either the data input 46a or output 46b of the standard magnetic card reader 35 as the turntable and collet assembly 29 in the compact disk drive unit 21 rotates. This is equivalent to the swiping of the magnetic strip of a standard credit card through the insert section 42 in the card reader 35. The standard magnetic card reader 35 includes a standard telephone modem 47 for communicating with a conventional credit card authorization center 45.

The drive assembly 20 is automatically activated when the card portion 14 is inserted into the turntable and disk collet assembly 29 in the compact disk drive unit 21 of the drive assembly 20 for transmitting data from the rectangular portion 14 of the card 10 to the authorization center 45 for authorization of a transaction. The compact disk drive unit 21 is also connected to a conventional data processing machine 50 such as a personal computer or commercially available cash register which includes a CPU 51, a data I/O port 52, a monitor display 53, a keyboard user interface 54 and a telephone modem 55. When a transaction is processed using the compact disk drive unit 21 with a conventional data processing machine 50 the data representative of the transaction may be written to the storage portion 14. A credit card authorization center 45 may be connected to the telephone modem 55 in the computer or cash register 50 to read information i.e. data from the rectangular portion 14 of the card 10 through the data I/O port 52 in the computer or cash register 50 and likewise the authorization center 50 can write to the rectangular portion 14 of the card 10 by means of the telephone modem 55. Alternatively information can be automatically written to the rectangular portion 14 of the card 10 through the keyboard user interface 54 in the computer or cash register 50 simultaneously with the handling of the transaction and be displayed on the monitor 53. Thus not only will a credit transaction occur in a manner equivalent to the use of a conventional credit card but the information representing the item of purchase, the price, the date of purchase and location etc. can also be stored into the rectangular portion 14 of the card 10.

The above is also possible using the compact disk drive unit 21 with a magnetic swipe unit 33 provided the magnetic swipe unit 33 is outfitted with a telephone modem and/or keyboard interface.

Initially a manufacturer of the mass storage information card 10 will provide a user with one security ring 12 and one detachable storage portion 14. When the mass storage information card 10 is placed in the drive unit of the users personal computer an Install program stored in the security ring 12 will provide a menu to the user to prompt the user through an installation and set up procedure to personalize the security ring 12 with a user identification password and to customize the detachable portion 14. The user will be presented with several levels of security information for the user to adopt one or more PIN numbers and/or passwords for both the security ring 12 and detachable portion 14 which marries the security ring 12 to the detachable portion 14. Thereafter, only the correct verifiable detachable portion 14 can be used with the security ring 12. Without the original security ring 12 which functions as the master the detachable portion 14 has limited utility in that it can only be used independent of the security ring 12 and then only until the owner elects to deactivate it.

As above indicated after installation the options menu stored in the security ring 12 will direct the user through various options which will permit the user to activate the card 10, create security codes, change security codes, place card restrictions, review transactional and account information, add new account or delete an account, download all or selected information to a hard drive and create a new card, create additional cards, deactivate or delete cards. It should be understood that all of the above options are available to the user when using the security ring 12 after proper password verification in combination with the correct data storage portion 14 inserted in the card 10. This will essentially prevent attempted modification or downloading of data from the detachable data storage portion 14 independent of the security ring 12 and will require the proper security ring 12 to be used with advance knowledge of the security passwords. In addition since the data storage portion 14 has no information printed on it such as a name, account number, address or other identification its repeated use when or if stolen becomes difficult if not impossible. Moreover, the owner can readily deactivate the stolen data storage portion 14, communicate its deactivation to the authorized credit card center 45 through the Internet and create a new data storage portion 14 with a different card number.

The option menu following set-up permits the user to customize the rectangular portion 14 of the card 10 for use as one or more different credit cards. For example if the user wants the rectangular portion 14 to be a "Master Card" the proper account number identifying the card as a "Master Card" will have to be entered for use with a specific credit card authorization center 45. A PIN number for use with that account number will also have to be entered. When a transaction is completed transactional data will be written to the rectangular portion 14 associated with that account number and PIN number. A second "American Express" account number can also be entered with another PIN number for American Express card usage etc.

When the rectangular portion 14 is used as an information card to, for example, provide medical records the medical records will be stored in the rectangular portion 14 as encrypted data retrievable only by a drive unit 21 having appropriate decoding software stored in its system software and made available to a given doctor and/or hospital to read thereby preventing the reading of such records by an unauthorized person.

A very important feature of the mass storage information card 10 of the present invention is the ability to create user restrictions on the user's use of the rectangular portion 14 of the card 10 independent of the security ring 12. This will prevent any unauthorized use of the card until the restriction is lifted or modified. The restriction can be programmed to be automatically modified after a given time period or to require specific input from the user if the price or terms exceeds the restriction. The specific input can be another user PIN number to override the restriction. The programming of restrictions upon the use of the detachable data storage portion 14 severely limits the potential to steal the detachable data storage portion 14 and, if stolen, to use it. For example, the options menu software permits the owner to impose user restrictions on the use of the detachable storage portion 14 inclusive of the following restrictions: dollar purchase at any one time, time duration restrictions, type of purchase restrictions including articles which cannot be purchased with the card, geography restrictions etc. By restricting the type of purchase items such as alcoholic beverages can be prevented from being purchased.

When the storage portion 14 is placed in the drive unit 21 these restrictions are read at the time of activation by the computer or cash register 50 thereby preventing improper use. If used with a conventional card swipe reader 35 many of these restrictions will not be able to be read unless the authorization center 45 is connected by modem to the drive unit 21.

In addition, the security ring 12 of the card 10 includes card duplication software, account tracking software, and user viewing encryption and decoding software. Personal security information and user security personal identification number(s) are stored in the security ring 12 as well as in the detachable portion of the card 14. Although encryption algorithms are used in the present invention to secure the stored data and to prevent fraudulent or improper use as well as to limit access to the stored information the algorithms themselves to encrypt and decode data do not form a part of the present invention. In fact any conventional encryption methodology may be used in the preparation of suitable encryption algorithms and for decoding the algorithms.

Many levels of security and personal security information can also be imposed on the use of the storage portion 14 of the card 10 as well as the security ring 12.

What I claim is:

1. A universal mass storage information card comprising a first data storage portion having a circular geometry in the form of a disk and a second data storage portion physically detachable from the first data storage portion with the second data storage portion defining a geometrical area disposed within the periphery of the first data storage portion and being concentric with said first data storage portion.

2. A universal mass storage information card as defined in claim 1 wherein the second data storage portion is rectangular in geometry.

3. A universal mass storage information card as defined in claim 2 wherein the first data storage portion contains software for directing the downloading of information stored in the second data storage portion when the two data storage portions are inserted as a combined unit into a data processing machine or personal computer.

4. A universal mass storage information card as defined in claim 3 wherein the second data storage portion has a small aperture in the center thereof of a size adapted for placement of the second data storage portion on a conventional turntable collet assembly.

5. A universal mass storage information card as defined in claim 4 wherein the first data storage portion further comprises software to verify user identification when the two portions are combined and inserted as a disk into a data processing machine or personal computer.

6. A universal mass storage information card as defined in claim 5 wherein the first data storage portion further comprises software for providing instructions to the user to incorporate software restrictions into the second data storage portion when the two portions are combined and inserted as a disk into a data processing machine or personal computer such that when the second data storage portion is used as an independent credit card its use will be subject to such restrictions.

7. A driver assembly for the rectangular data storage portion of the universal mass storage card of claim 3 having a compact disk drive unit for transferring information data to and reading information data from said rectangular data storage portion of the universal mass storage card wherein said compact disk drive unit comprises: a disk collet assembly with a turntable and platen, said platen having a circular rotating surface area equivalent to the surface area of the universal information storage information card and a rectangular slot sized to receive said rectangular data storage portion in the same geometric arrangement as between the first and second portion in the universal information storage information card, a drive motor for rotating said disk collet assembly, a read/write laser assembly for writing information upon said rectangular data storage portion and for reading information therefrom and disk system operating software including a software file allocation table for identifying information tracks in said second portion for writing information thereto and reading information therefrom independent of the first data storage portion.

8. A driver assembly as defined in claim 7 wherein said compact disk drive unit further comprises a data input and a data output port for the compact disk drive unit to communicate with a data input/output port for a data processing machine or other data input/output port device.

9. A driver assembly as defined in claim 8 further including a magnetic swipe adapter unit comprising a data input/output port device to communicate with the data input/output port of the compact disk drive unit, an amplifier, a magnetic coil and a swipe insert plate of a size and configuration to be inserted into the slot of a magnetic credit card swipe unit for communicating with a credit card or financial institution.

* * * * *